(12) United States Patent
Ahn

(10) Patent No.: US 10,096,138 B2
(45) Date of Patent: Oct. 9, 2018

(54) CONTROL MAP PROVIDING METHOD AND APPARATUS

(71) Applicant: SAMSUNG SDS CO., LTD., Seoul (KR)

(72) Inventor: Pyung Gil Ahn, Seoul (KR)

(73) Assignee: SAMSUNG SDS CO., LTD., Songpa-gu, Seoul (KR)

( * ) Notice: Subject to any disclaimer, the term of this patent is extended or adjusted under 35 U.S.C. 154(b) by 433 days.

(21) Appl. No.: 14/927,772

(22) Filed: Oct. 30, 2015

(65) Prior Publication Data

US 2016/0124616 A1  May 5, 2016

(30) Foreign Application Priority Data

Oct. 31, 2014 (KR) .......................... 10-2014-0150313

(51) Int. Cl.
*G06F 3/048* (2013.01)
*G06T 11/20* (2006.01)
(Continued)

(52) U.S. Cl.
CPC ............ *G06T 11/206* (2013.01); *G05B 15/00* (2013.01); *G05B 15/02* (2013.01); *G06F 11/00* (2013.01);
(Continued)

(58) Field of Classification Search
CPC .. G06F 19/322; G06F 19/3418; G06F 19/323; G06F 17/30864; G06F 3/0482;
(Continued)

(56) References Cited

U.S. PATENT DOCUMENTS 5,911,145 A  *  6/1999  Arora ...................... G06F 17/21
                                                    707/E17.013
2003/0095141 A1*  5/2003  Shah .................. G06F 9/44505
                                                    715/735
(Continued)

FOREIGN PATENT DOCUMENTS

JP        10268933 A    10/1998
JP      2002251431 A     9/2002
(Continued)

OTHER PUBLICATIONS

Communication dated Nov. 2, 2016, issued by the Korean Intellectual Property Office in counterpart Korean Application No. 10-2014-0150313.
(Continued)

*Primary Examiner* — Di Xiao
(74) *Attorney, Agent, or Firm* — Sughrue Mion, PLLC

(57) ABSTRACT

A method of providing a control map for a control target facility is provided. The method includes generating a central node corresponding to an interest object, the interest object being selected by a user from among first objects managed by a remote control system; generating peripheral nodes respectively corresponding to second objects that are associated with the interest object, the second objects being selected from among the first objects; generating an edge which connects the central node to one of the peripheral nodes or connects the peripheral nodes to each other; and graphically rendering the central node, the peripheral nodes, and the edge to be displayed.

21 Claims, 18 Drawing Sheets

(51) Int. Cl.
*G05B 15/00* (2006.01)
*G06F 11/00* (2006.01)
*G06Q 50/06* (2012.01)
*G05B 15/02* (2006.01)

(52) U.S. Cl.
CPC ..... *G06Q 50/06* (2013.01); *G05B 2219/2642* (2013.01)

(58) Field of Classification Search
CPC ......... G06F 17/30554; G06F 17/30958; G06F 17/30994; G06F 17/30705; G06F 3/04817; G06F 17/30513; G06F 17/3053; G06F 17/3089; G06F 17/30961; G06F 3/0418; G06F 3/044; G06F 3/047; G06F 11/0748; G06F 11/079; G06F 11/3055; G06F 11/327; G06F 17/30731; G06F 19/321; G06F 1/12; G06F 21/36; G06F 3/04842
USPC ........................................................ 715/713
See application file for complete search history.

(56) References Cited

U.S. PATENT DOCUMENTS

| | | | | |
|---|---|---|---|---|
| 2008/0065977 | A1* | 3/2008 | Gottlieb | G06F 8/34 715/203 |
| 2011/0022688 | A1* | 1/2011 | Gvirtsman | H04L 41/12 709/220 |
| 2013/0063264 | A1* | 3/2013 | Oktem | G05B 23/024 340/540 |
| 2015/0347559 | A1* | 12/2015 | Elias | G06F 17/30584 707/737 |

FOREIGN PATENT DOCUMENTS

| | | |
|---|---|---|
| KR | 1020090025844 A | 3/2009 |
| KR | 101039414 B1 | 6/2011 |
| KR | 10-1093145 B1 | 12/2011 |
| KR | 1020110136023 A | 12/2011 |
| KR | 1020130059116 A | 6/2013 |

OTHER PUBLICATIONS

Communication dated Sep. 27, 2017, issued by the Korean Intellectual Property Office in corresponding Korean Application No. 10-2014-0150313.

* cited by examiner

[fig. 1]
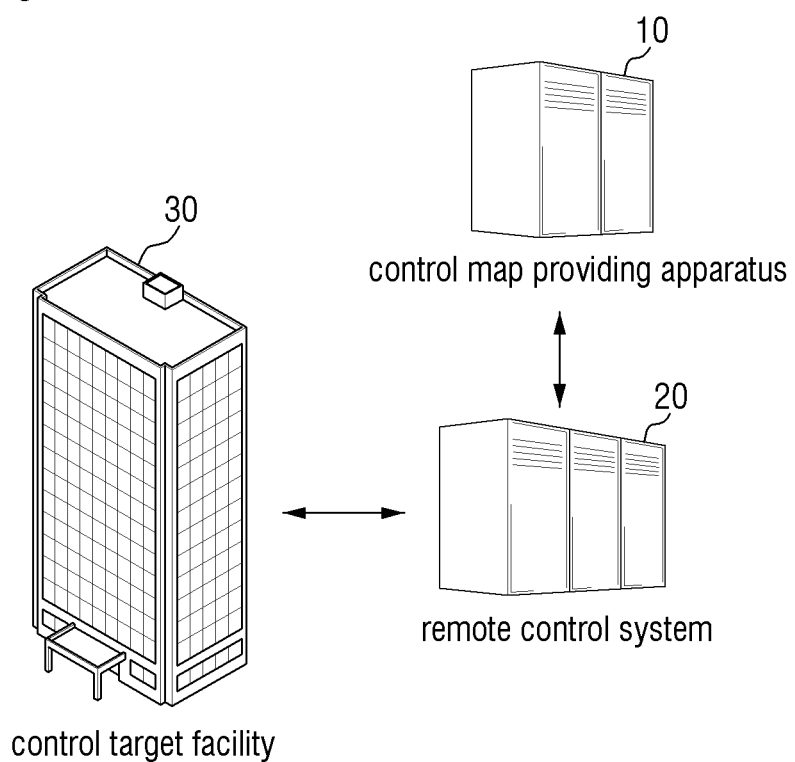

[fig. 2]
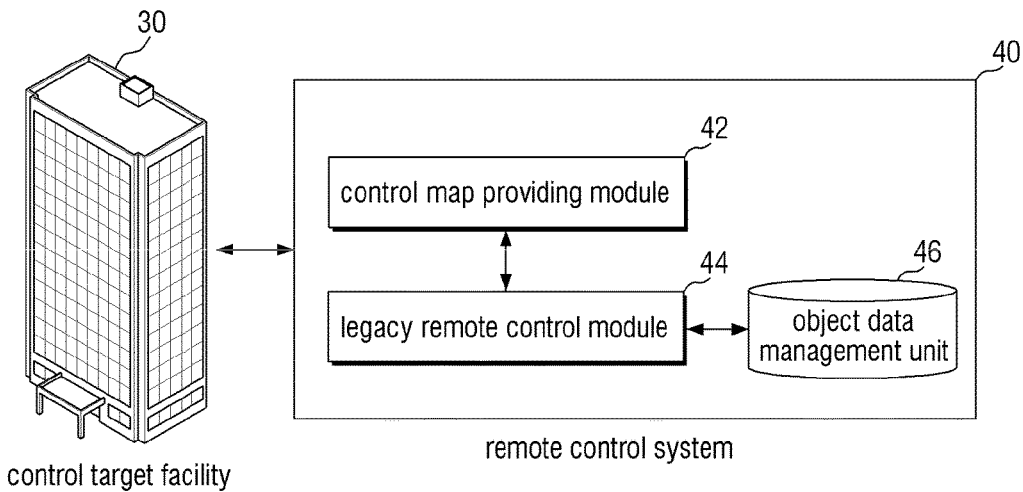
[fig. 3]
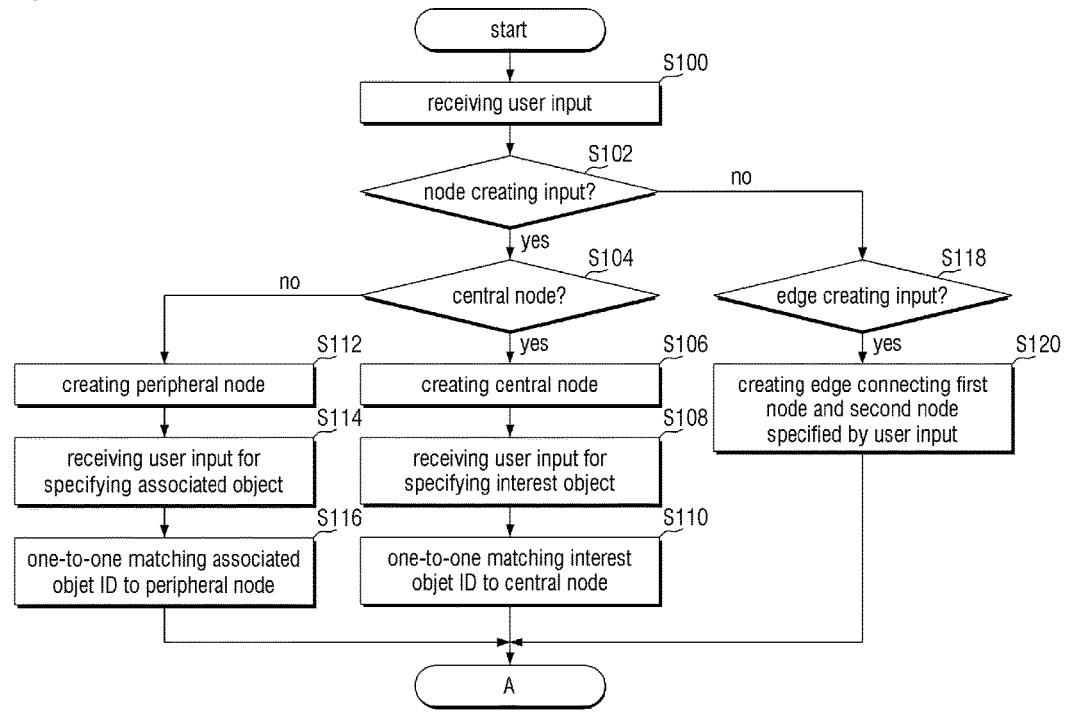

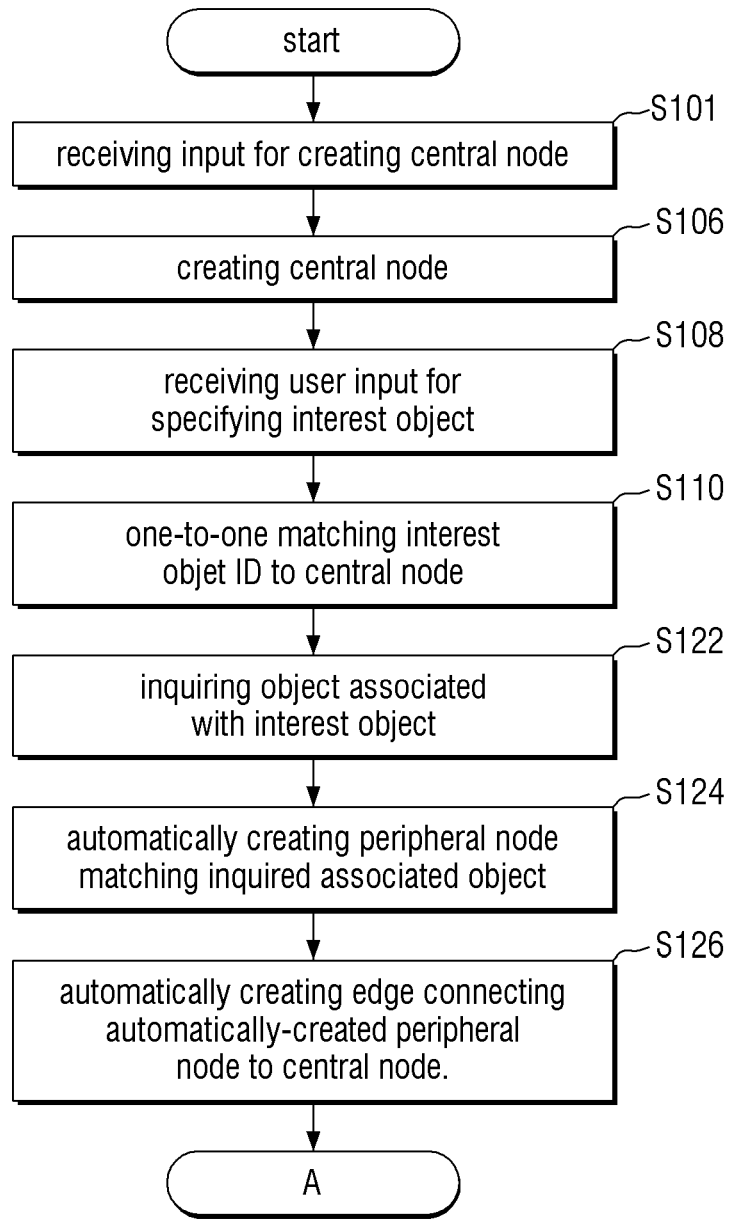
[fig. 4]

[fig. 5]
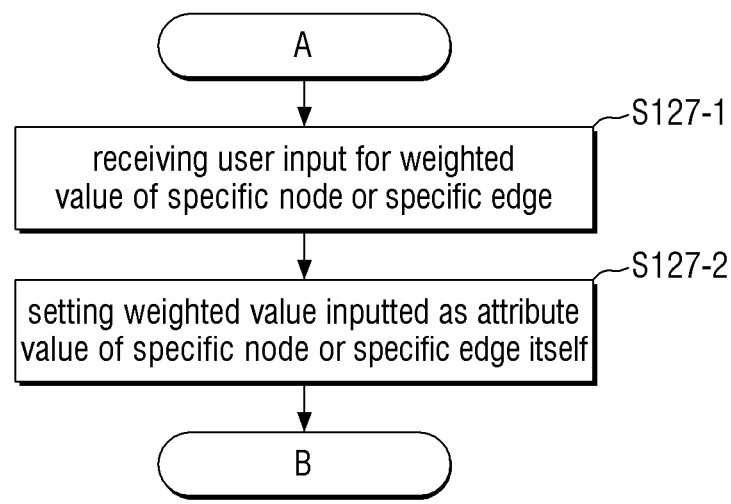

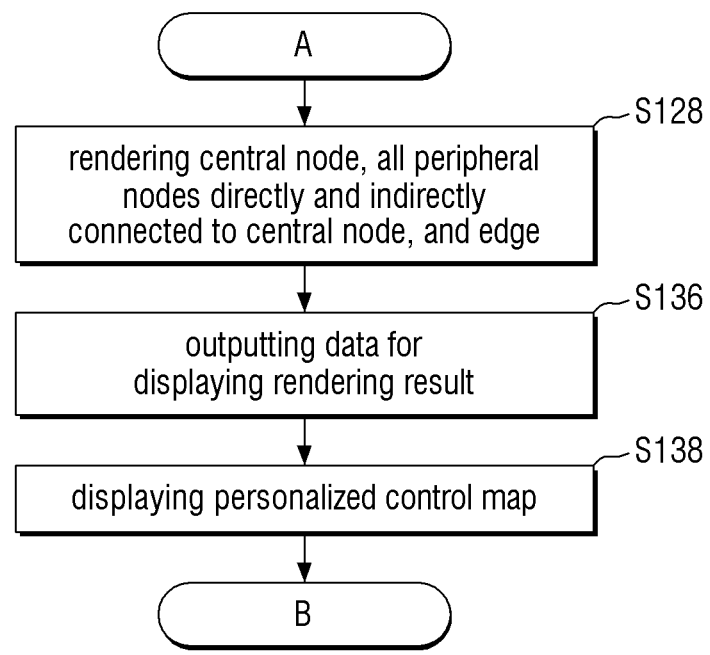
[fig. 6]

[fig. 7]
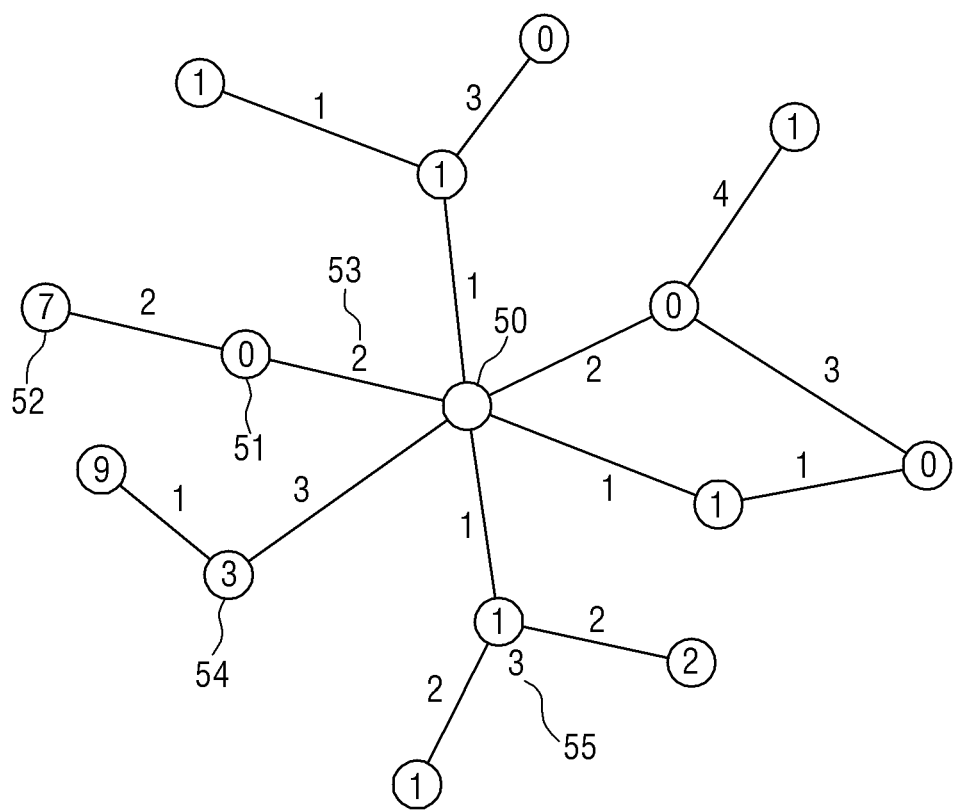

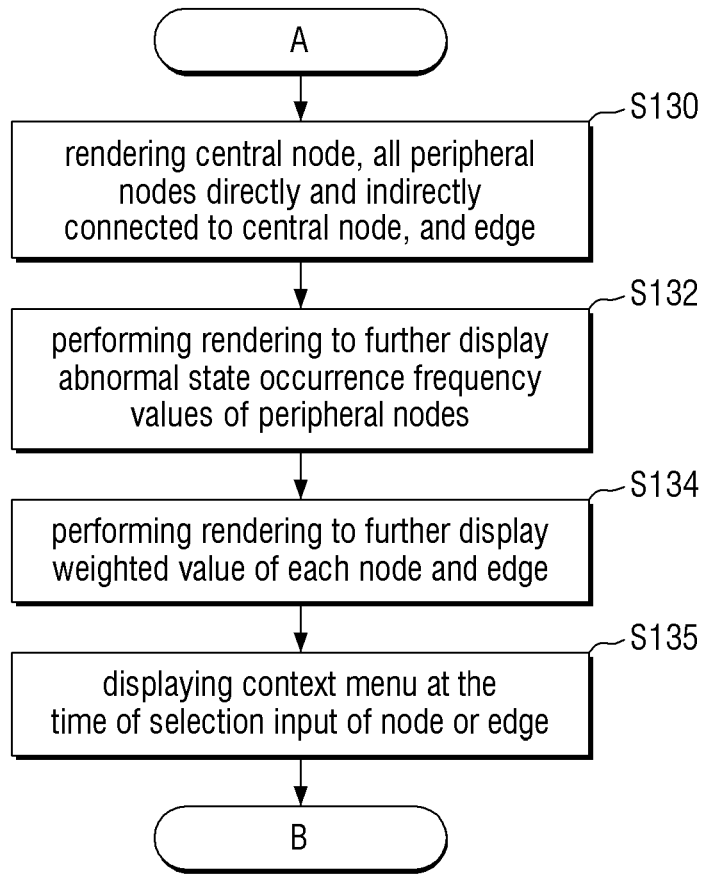
[fig. 8]

[fig. 9]
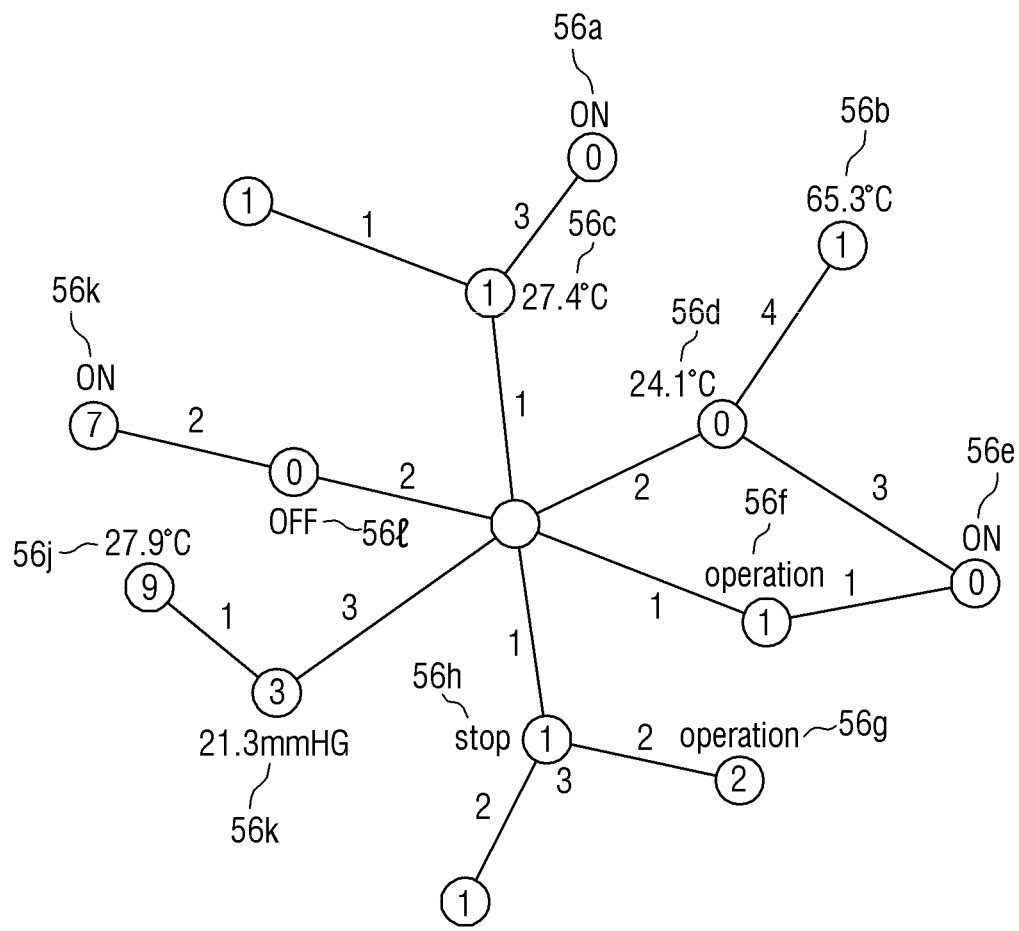

[fig. 10]
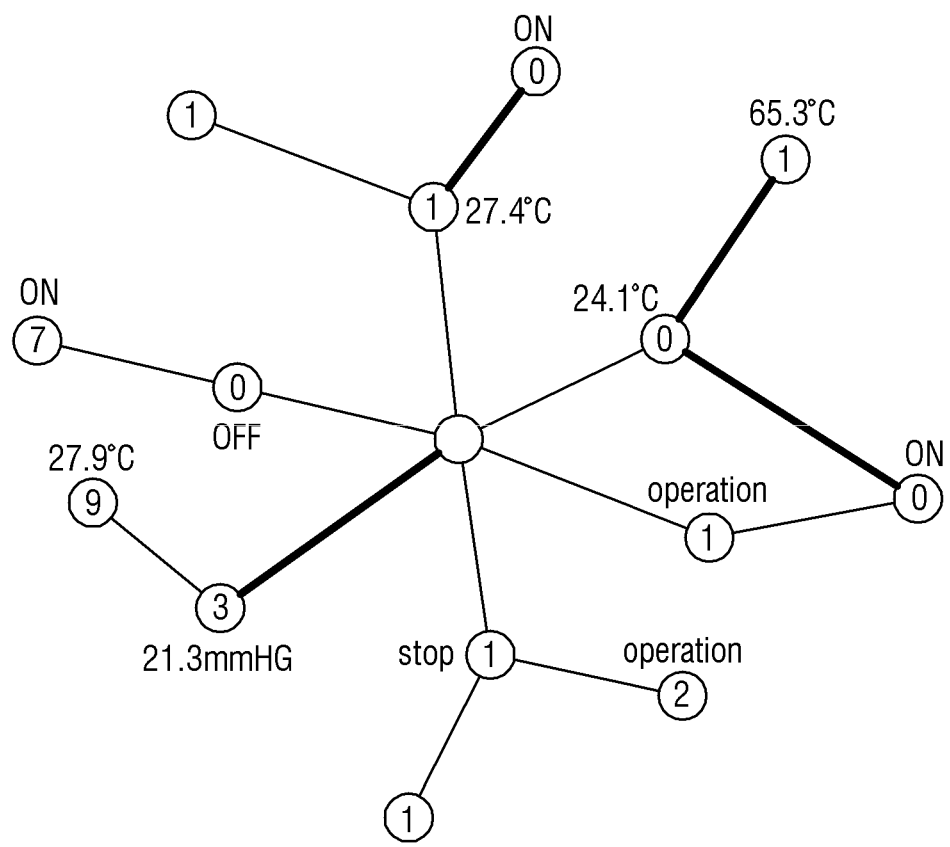

[fig. 11]
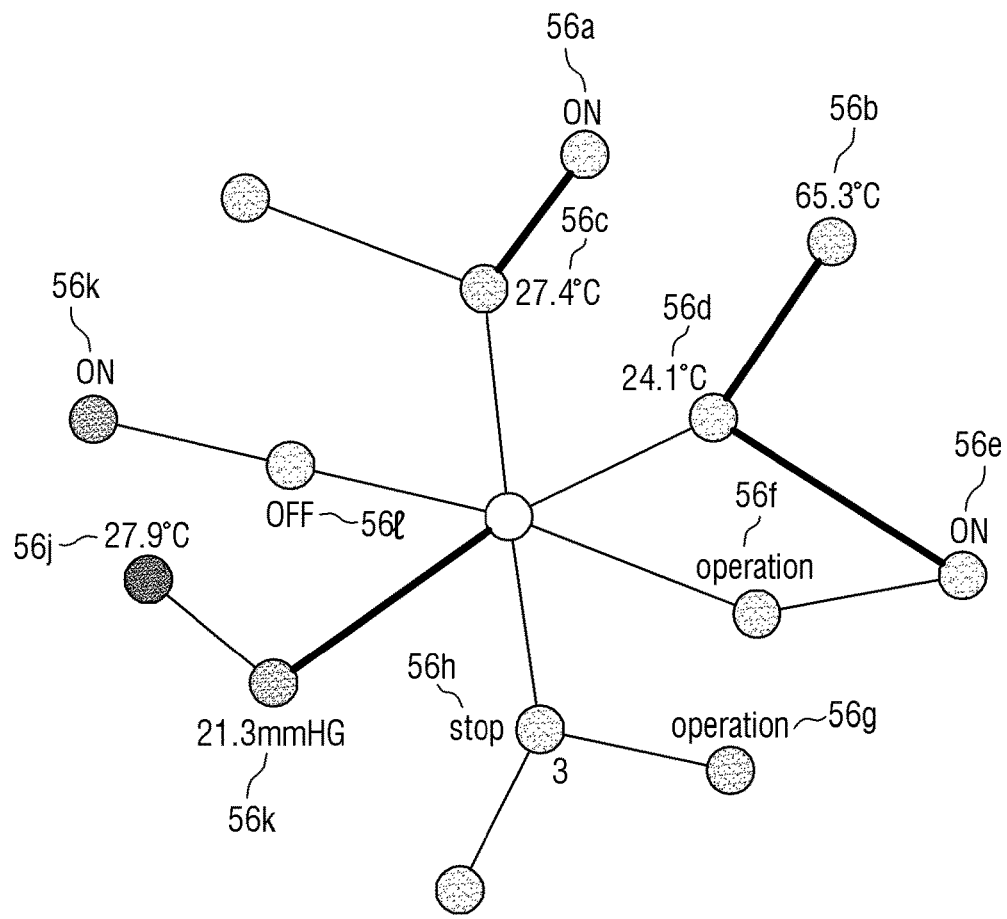

[fig. 12]
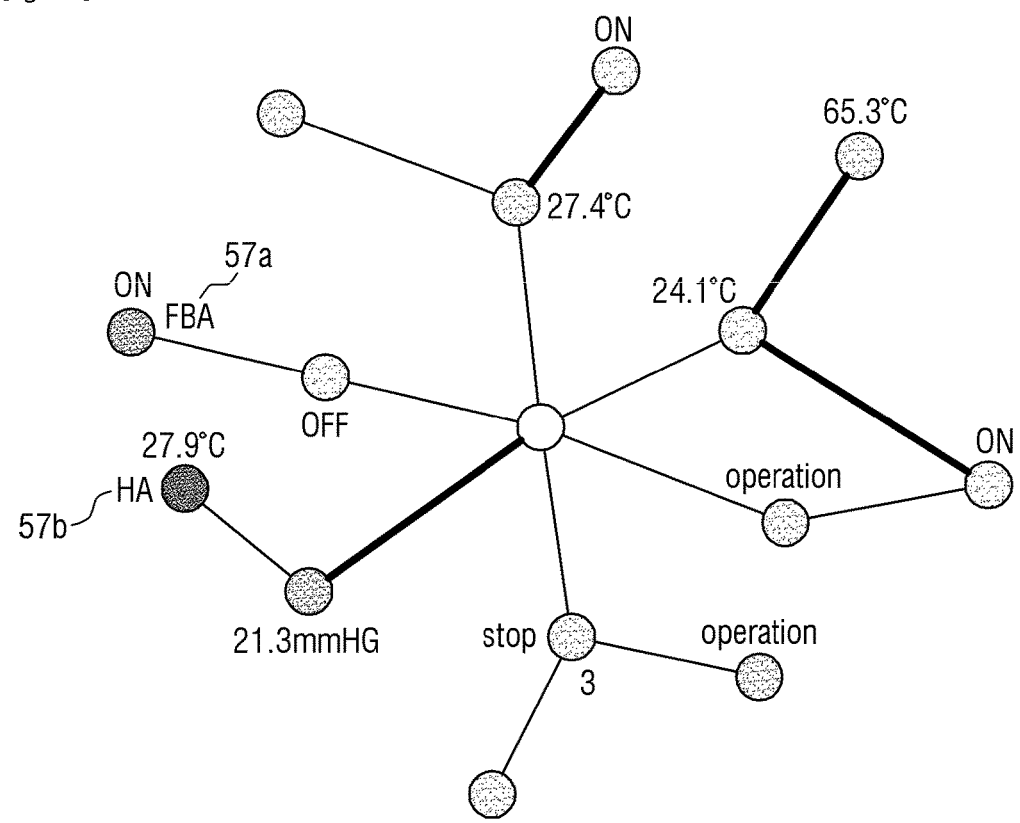

[fig. 13]
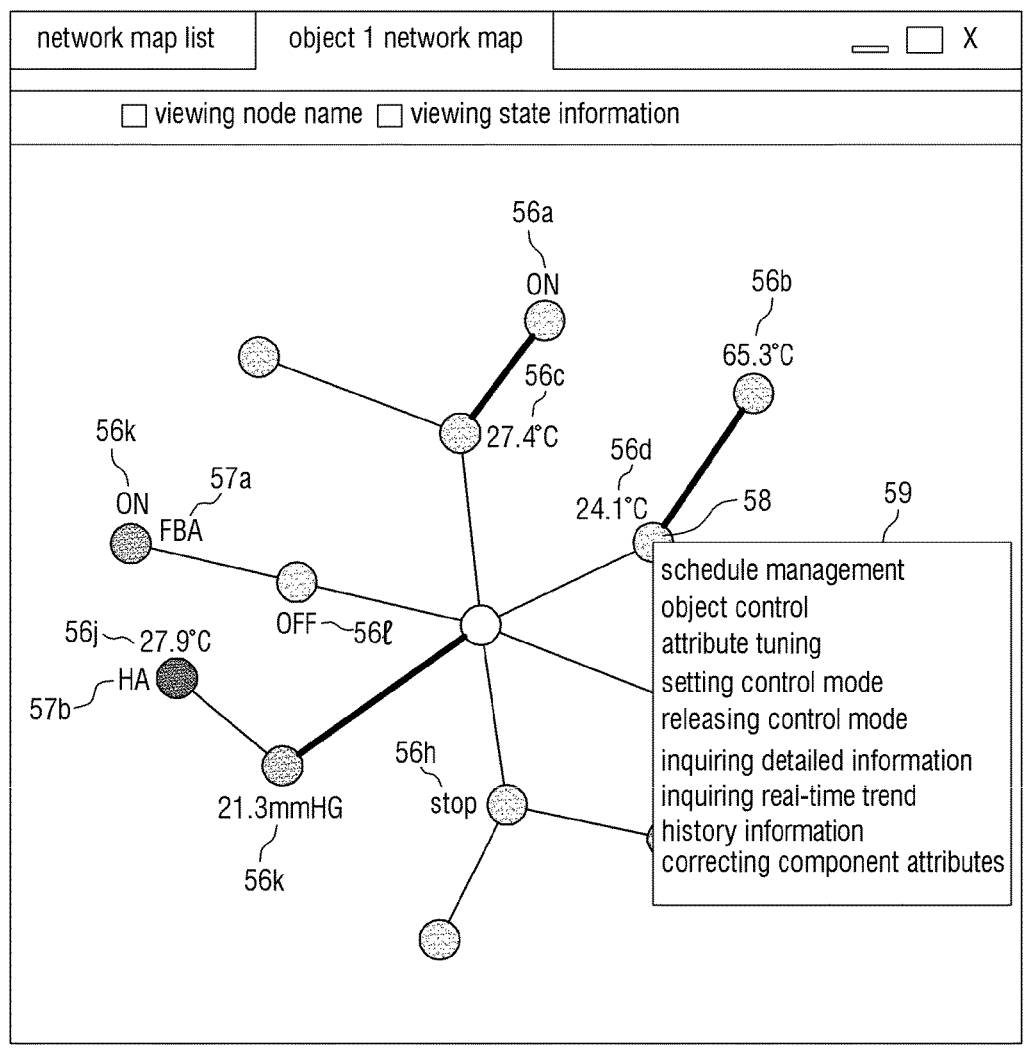

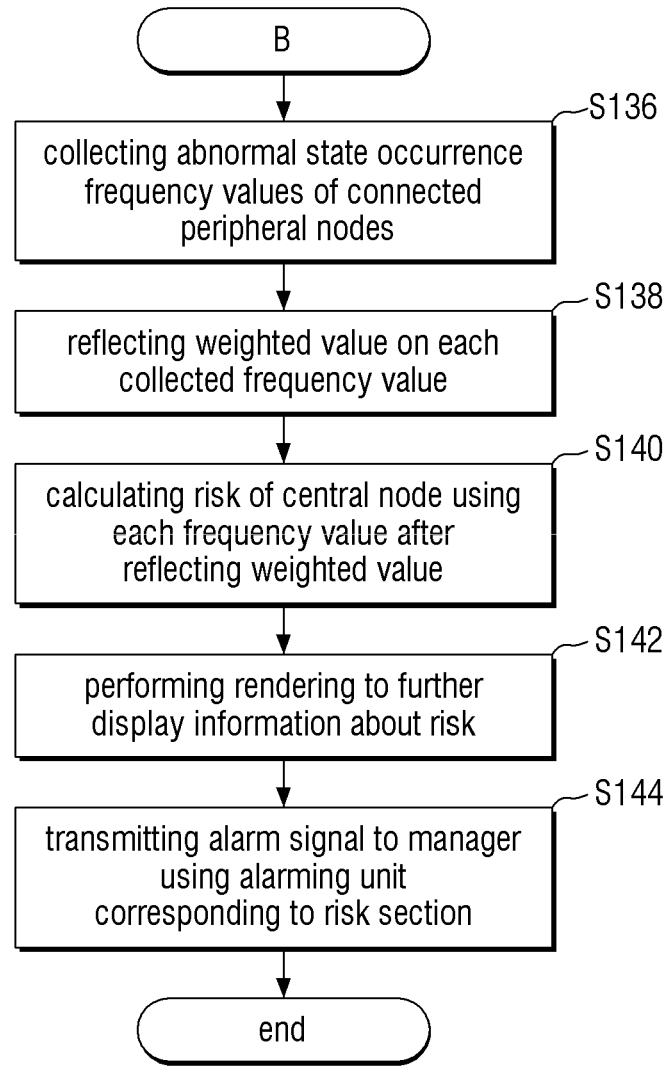
[fig. 14]

[fig. 15]
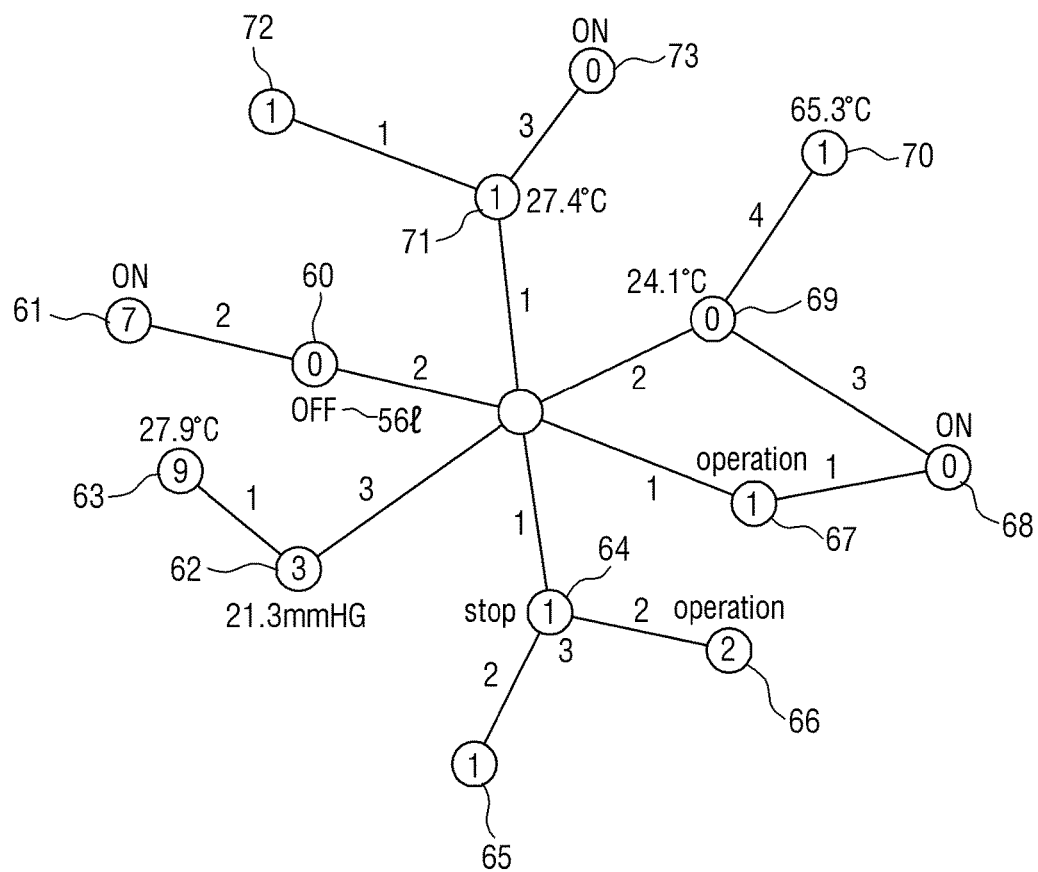

[fig. 16]
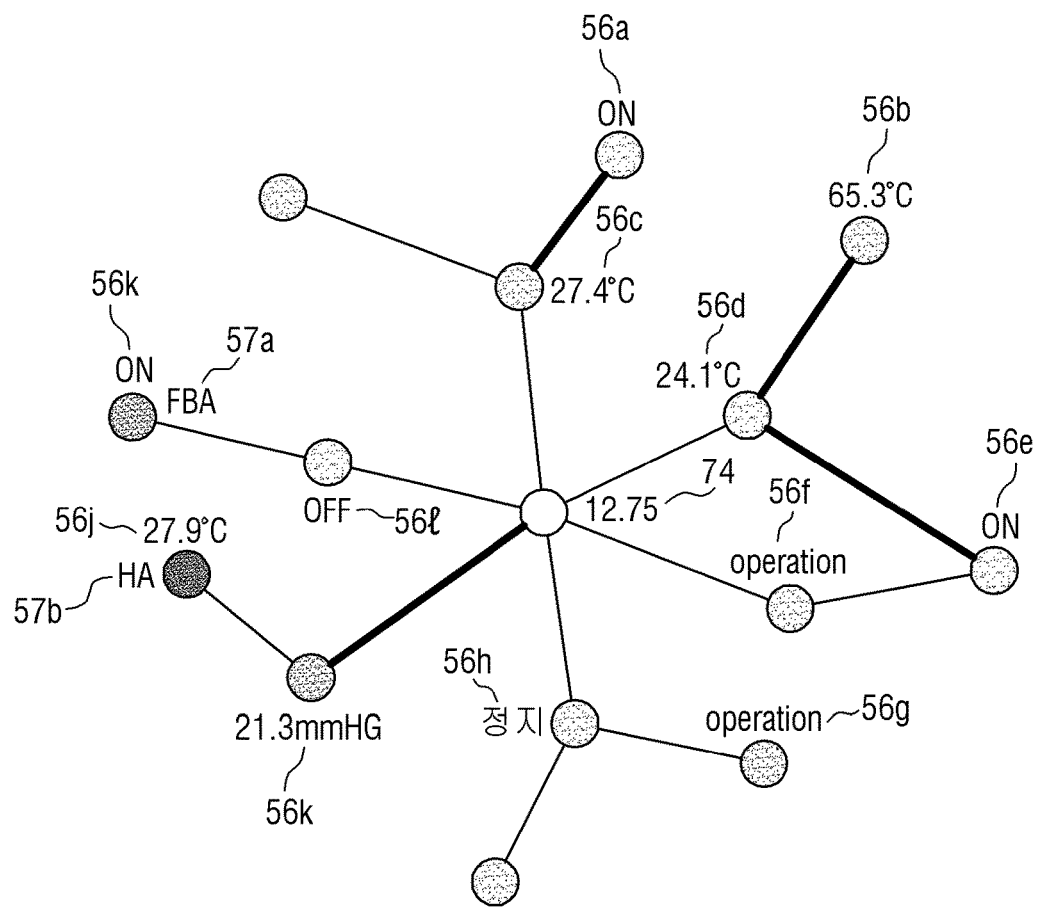

[fig. 17]
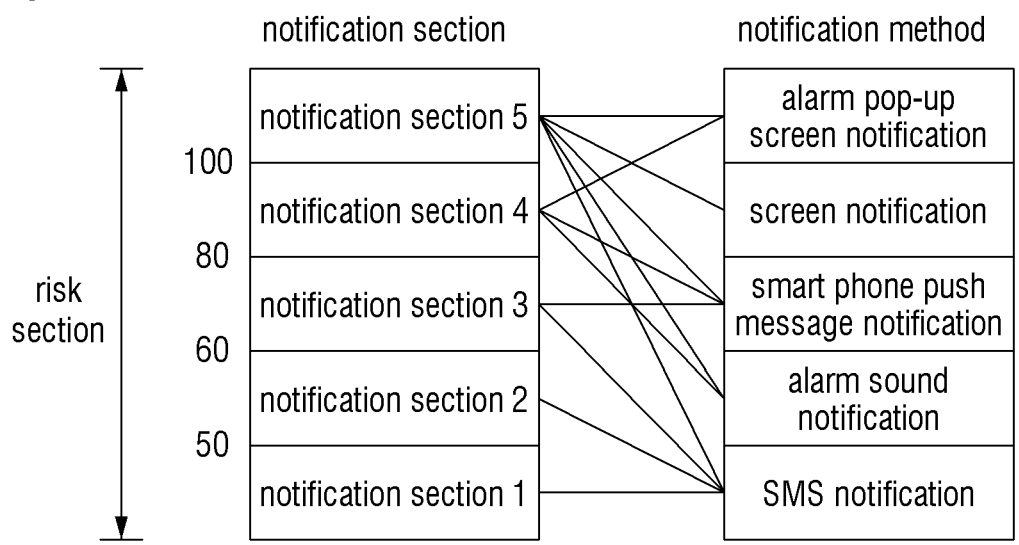

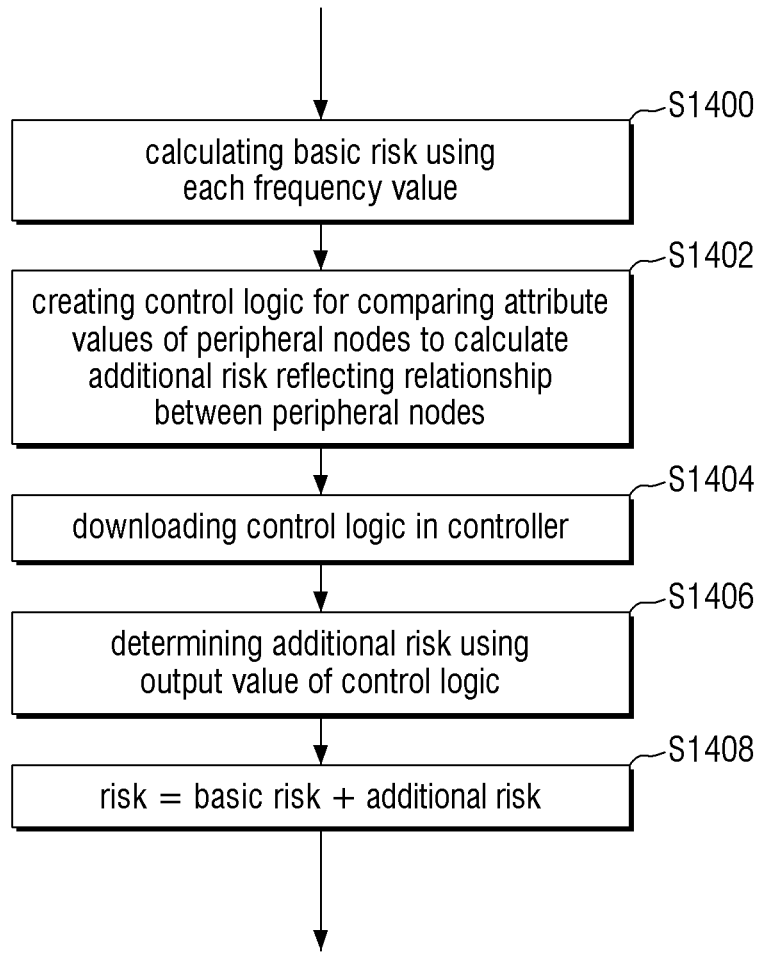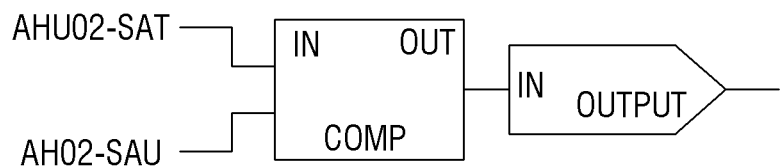

[fig. 20]
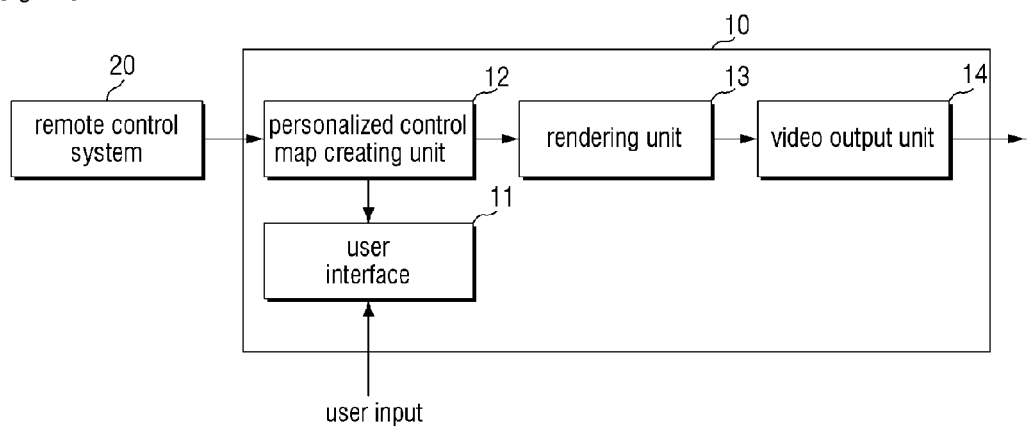
[fig. 21]
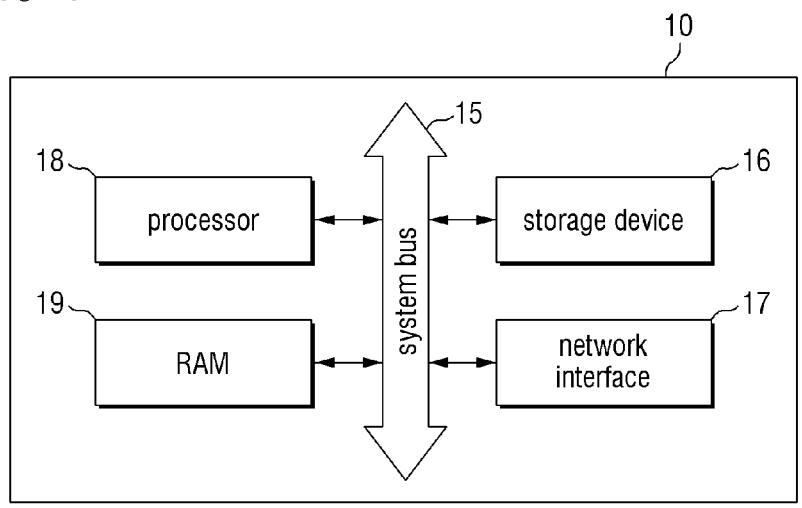

CONTROL MAP PROVIDING METHOD AND APPARATUS

This application claims priority from Korean Patent Application No. 10-2014-0150313, filed on Oct. 31, 2014, in the Korean Intellectual Property Office, the disclosure of which is incorporated herein by reference in its entirety.

BACKGROUND

1. Field

The present invention relates to a control map providing method and apparatus for facilities, such as buildings, factories, and stadiums. More particularly, the present invention relates to a control map providing method and apparatus, by which, among all objects in control target facilities managed by a remote control system, objects attracting attention of users responsible for a remote control and status related to the objects are examined, and actions according to the result of the examination can be performed.

2. Description of the Related Art

Medium and large buildings, such as commercial buildings, public buildings, and apartments, are provided with field equipment (building equipment), such as air conditioners for maintaining indoor air at a state suitable for the intended use of interior by adjusting the temperature, humidity and purity of the indoor air, boilers, pumps, and the like. As the scale of facilities became huge to such a degree that it is impossible to check whether each facility is normally operated by workers, a remote control system utilizing ICT technologies has been provided.

However, as the scale of facilities became huge, the number of objects (for example, control points installed in control target facilities, equipment, and controllers) has increased, and problems of how and whether to effectively provide information about objects have occurred. For example, although objects are respectively provided in the form of a tree based on the hierarchical structure among the objects, and the user of a remote control system finds the interest object from the tree, the structure and scale of the tree will be complicated and enlarged if the number of objects increases. Consequently, it is required to provide a technology for providing the object managed by a remote control system to the user of the remote control system in a new form.

SUMMARY

Aspects of the present invention provide a control map providing method and apparatus, which support the configuration of a control map including a central node indicating an interest object selected by a user, a peripheral node indicating an object associated with the interest object, and an edge connecting the nodes.

Aspects of the present invention also provide a control map providing method and apparatus, in which a current value of each node (for example, current temperature in the case of temperature measurement control point), a weighted value of each node, a weight value of each edge, and abnormal state occurrence frequency of each node are displayed on the control map in various manners to have high visibility, thereby supporting the state monitoring using the control map.

Aspects of the present invention also provide a control map providing method and apparatus, which supports the automatic configuration of the control map including an interest object and an object associated with the interest object if the interest object is specified by a user.

Aspects of the present invention also provide a control map providing method and apparatus, which supports the user UI, such as a context menu, for supporting a direct access to the attribute value of each node included in the control map.

Aspects of the present invention also provide a control map providing method and apparatus, in which the risk of the central node of the control map is calculated using the abnormal state occurrence frequency, the risk is displayed, and alarm signals are generated depending on the risk.

However, aspects of the present invention are not restricted to the one set forth herein. The above and other aspects of the present invention will become more apparent to one of ordinary skill in the art to which the present invention pertains by referencing the detailed description of the present invention given below.

As described above, the present invention is advantageous in that a user using a control system of a facility, such as a building, a factory, or the like, makes information about its own desired objects into a control map in its own desired form, and whether the control map is displayed is checked, and thus the user can more easily perform a facility management task.

Further, the present invention is advantageous in that, when the control map is made, the risk of the central node of the control map is automatically calculated, and thus the risks occurring in the objects managed by the user of a control system can be easily managed.

BRIEF DESCRIPTION OF THE DRAWINGS

The above and other aspects and features of the present invention will become more apparent by describing in detail exemplary embodiments thereof with reference to the attached drawings, in which:

FIG. 1 is a layout view of a remote control system according to an embodiment of the present invention;

FIG. 2 is a block diagram of a remote control system according to another embodiment of the present invention;

FIG. 3 is a flowchart of a control map manual creating process, which is a part of a control map providing method according to an embodiment of the present invention;

FIG. 4 is a flowchart of an automatic control map creating process, which is a part of the control map providing method;

FIG. 5 is a flowchart of a process of setting weighted values of nodes and edges, which is a part of the control map providing method;

FIG. 6 is a flowchart of a process of rendering and displaying a control map, which is a part of the control map providing method;

FIG. 7 shows an example of a screen that is displayed on the user's display device, as the result of performing the method of FIG. 6.

FIG. 8 is a flowchart of a process of rendering and displaying a control map and additional information thereof, which is a part of the control map providing method;

FIGS. 9 to 12 show examples of screens that are displayed on the user's display device, as the result of performing the method of FIG. 8;

FIG. 13 is a schematic view illustrating a user interface for inquiring and changing the node attribute values displayed on a screen of a user when the user provides a selection input for each node of the control map created by the control map providing method of FIG. 13;

FIG. 14 is a flowchart of a process of calculating the risk of a central node, which is a part of the control map providing method;

FIG. 15 is a supplemental view for explaining the method of FIG. 14;

FIG. 16 shows an example of a screen that is displayed on the user's display device, as the result of performing the method of FIG. 14;

FIG. 17 is a view for explaining a risk alarm signal transmission according to the method of FIG. 14;

FIG. 18 is a flowchart for specifically explaining the operation of adjusting the risk calculated by reflecting the results of the operation of comparing the attribute values of peripheral nodes through a control logic and the operation of the control logic;

FIG. 19 shows an example of graphic design of the control logic created by the method of FIG. 18;

FIG. 20 is a block diagram of a control map providing apparatus according to another embodiment of the present invention; and FIG. 21 is a block diagram of hardware of the control map providing apparatus according to another embodiment of the present invention.

DETAILED DESCRIPTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the size and relative sizes of layers and regions may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terminology used herein is for the purpose of describing particular embodiments only and is not intended to be limiting of the invention. As used herein, the singular forms are intended to include the plural forms as well, unless the context clearly indicates otherwise.

Hereinafter, the configuration and operation of a remote control system according to an embodiment of the present invention will be described with reference to FIG. 1. The remote control system according to the present embodiment includes a remote control system 20 and a control map providing apparatus 10.

The remote control system 20 monitors various equipment and control points provided in a control target facility 30, and controls the equipment according to the input of a user. For this purpose, the remote control system may be connected to a controller, such as a direct digital controller (DDC), through a network. The direct digital controller (DDC) monitors and controls the equipment in the control target facility 30 through control points corresponding to various sensors and loads.

The direct digital controller (DDC) can download software for monitoring and controlling the equipment from the remote control system 20. Hereinafter, the software is referred to as "control logic". Although described in detail later, the control logic, as shown in FIG. 19, is written in a graphic form, the graphic form of the control logic is converted into a text form through a graphic parsing process, and this text form can be converted into an executable code in the DDC through a compiling process.

The control target facility 30 is one of various facilities, such as buildings, stadiums, laboratories, factories, airports, seaports, theme parks, apartments, and hotels, which are monitored and controlled by information and communication technologies.

In order to monitor and control the control target facility, the remote control system 20 can manage various equipment, control points, controllers, and control logics, provided on the control target facility 30, and various management media, such as control reports and graphic pages, created by a user of the remote control system 20, as objects.

The objects managed in the remote control system 20 include the following objects.

Control points: for example, temperature, humidity, pressure, flow rate, and the like of specific equipment.

Control report: digital contents about management circumstances written by a user of the remote control system 20 while being a manager of the control target facility 30. This control report may include data about real-time trend of specific control point, operation schedule of specific equipment, and abnormal state occurrence frequency of specific control point.

Controller: controller receives the current values of control points, performs a digital calculation of input values by control logic, and outputs a control signal of equipment as the result of the digital calculation. An example of the controller includes a direct digital controller (DDC).

Control logic: control logic is software for monitoring and controlling equipment, and is downloaded in controller.

Graphic page: graphic page is a graphic screen used to intuitively perform a real-time control of an equipment operating status of the control target facility 30. The status of equipment and the control point operation status of equipment can be expressed on this graphic screen in the form of animation.

Real-time trend: real-time trend is digital data, such as a chart, which expresses the trend in change of current value of a specific control point. The real-time trend is updated in real time.

Operation schedules: operation schedules indicate daily, weekly and monthly operation schedule of specific equipment or controller. For example, there is a case that specific equipment is ON at 09:00 A.M and OFF at 11:00 P.M. every day.

Equipment: equipment is an apparatus installed in the control target facility 30, and is controlled by the controller. Examples thereof include air conditioner, boiler, and the like.

The control map providing apparatus 10 is connected to the remote control system 20 to receive information about objects of the control target facility 30. Further, the control map providing apparatus 10 provides data input by a user to the remote control system 20 when there is a user input for directly updating the attribute value of a specific object. In the remote control system 20, the existing attribute value of the specific object is updated by the attribute value provided from the control map providing apparatus 10.

The control map providing apparatus 10 creates a control map including a central node which one-to one matches an interest object selected from objects managed by a remote control system, the interest object being selected by a user; peripheral nodes, each of which one-to-one matches an object associated with the interest object, the object being selected from the objects managed by the remote control system; and edges, each of which connects the central node and the peripheral node or connects the peripheral nodes, renders the control map such that the control map is displayed on a user terminal (not shown), and sends display data, as the rendering result, to the user terminal. The user terminal may be connected to the control map providing apparatus 10 or the remote control system 20 through a network.

It is shown in FIG. 1 that the remote control system 20 and the control map providing apparatus 10 are separately configured. According to another embodiment, the control map providing apparatus 10 may be installed in a remote control system. Such a remote control system is shown in FIG. 2.

As shown in FIG. 2, the remote control system 40 according to this embodiment includes a control map providing module 42, a legacy remote control module 44, and an object data management unit 46.

The legacy remote control module 44 manages various objects associated with the control target facility 30 through the object data management unit 46 in order to monitor and control the control target facility 30. The control map providing module 42 perform the same function as the control map providing apparatus 10.

Each of the components of FIG. 2 may be software or hardware, such as a field-programmable gate array (FPGA) or an application-specific integrated circuit (ASIC). However, these components are not limited to software or hardware, and may be configured to exist in a storage medium that can perform addressing, and may also be configured to execute one or more processors. The functions of the components may be implemented by more finely-divided components, and the plurality of components may also be converted into one component having a specific function.

Hereinafter, a control map providing method according to an embodiment of the present invention will be described with reference to FIGS. 3 to 19. The control map providing method may be performed by a computing apparatus. The computing apparatus, for example, may be the control map providing apparatus 10 shown in FIG. 1 or the remote control system 40 shown in FIG. 2. Hereinafter, for the convenience of understanding, it should be noted that description of a subject performing each of the operations included in the control map providing method will be omitted.

First, processes of creating a control map, each of which is a part of the control map providing method according to the present embodiment, will be described with reference to FIGS. 3 and 4. Here, FIG. 3 shows a process of manually creating a control map through user operation, and FIG. 4 shows a process of creating a control map, in which an object associated with an interest object is automatically included in a control map when a user specifies only the interest object.

Referring to FIG. 3, the control map created in the control map providing method is configured by the operation of a user. That is, all of a main interest object and objects associated with the main interest object are specified by a user. Therefore, according to the present embodiment, a control map composed of only the objects to be expressed by a user can be configured. Further, according to the present embodiment, the logical relationship between the interest object and the associated object may be expressed in the form of an edge. Therefore, according to the present embodiment, the logical relationship between the objects can be visually easily recognized.

In a control map compiling screen, a user may input the creation of a node and the creation of an edge through a compiling UI (S100). In the case of an input for creating a node (S102), whether a central node is created may further be inputted (S104). In an embodiment, the compiling UI may include a button for creating a central node and a button for creating a peripheral node. When the button for creating a central node is selected and then a specific area of a compiling panel is specified, a central node is created in the specified area. Similarly, when the button for creating a peripheral node is selected and then a specific area of a compiling panel is specified, a peripheral node is created in the specified area.

When the central node is created (S106), a user input of specifying an interest object matching the created central node is provided (S108). The user input may include an ID of the interest object. The ID of the interest object may be selected from IDs of a plurality of objects presented through the compiling UI, or may be directly inputted by a user. The ID of the interest object will match the central node in a one to one manner (S110).

The interest object is specified by a user. When a user wants to configure a VIEW, which will be seen by the user, base on a specific object, the central node matching the specific object is created. Any type of object, managed by a remote control system, may be the interest object.

When the user input of creating a node indicates the creation of a peripheral node (S104), a peripheral node is created (S112), and a user input of specifying an associated object matching the created peripheral node is provided (S114). In this case, the user input may include the ID of the associated object. The ID of the associated object may be selected from IDs of a plurality of objects associated with the interest object presented through the compiling UI, or may be directly inputted by a user. In an embodiment, when the ID of the associated object is not related to the central node, an error message may be outputted. The ID of the associated object will match the peripheral node in a one to one manner (S110).

In an embodiment, the control map may be composed of one central node and a plurality of peripheral nodes. In another embodiment, the control map may be composed of a plurality of central nodes and a plurality of peripheral nodes.

When a user provides an edge creation input specifying a first node and a second node, an edge connecting the first node and the second node is created (S120).

Referring to FIG. 4, the method shown in FIG. 4 is different from the method shown in FIG. 3 in that, when a user specifies only the interest object, the objects associated with the interest object are automatically included in the control map. The method shown in FIG. 3 is advantageous in that a user can directly specify all the objects to be included in the control map, and thus the user has high degree of freedom. In contrast, the method shown in FIG. 4 is advantageous in that the simple operation of the user can be reduced when the user needs to include a large number of associated objects in the control map.

For example, when it is assumed that specific equipment is specified as an interest object, and the control point of the specific equipment is specified as an associated object, if the specific equipment has 100 or more control points, in the method shown in FIG. 4, efforts to create 100 peripheral nodes and match each of the control point to each of the peripheral node can be reduced.

When the user input of creating a central node is provided (S101), a central node is created (S106). Subsequently, when the user input of specifying an interest object matching the central node is provided (S108), the ID of the specified interest object matches the central node in a one-to-one manner (S110). The ID of the interest object may be selected from IDs of a plurality of objects presented through the compiling UI, or may be directly inputted by a user.

After the central node is created, the following works are automatically performed without user input. First, an object associated with the interest object is inquired (S122). For example, the object associated with the interest object is queried for to the remote control system and determined based on information from the remote control system. Next, a peripheral node matching the inquired object in a one-to-one manner is automatically created (S124). The position of the created peripheral node on a compiling panel is automatically determined by the previously-specified rule such that peripheral nodes are uniformly distributed around the central node. Next, each edge connecting the central unit and each of the peripheral nodes is automatically created without user input (S126). The associated object to be inquired may be changed depending on the type of the associated object. Hereinafter, several examples thereof are presented.

When the interest object is an object indicating equipment installed in the control target facility, the object associated with the interest object may be at least one of an object indicating a control point of the equipment, an object indicating a control logic provided in the equipment, and an object indicating an operation schedule of the equipment.

When the interest object is an object indicating a controller installed in the control target facility, the object associated with the interest object may be at least one of an object indicating a control point providing an input to the controller, equipment receiving a control signal form the controller, an object indicating a control logic provided in the controller, and an object indicating an operation schedule of the controller.

When the interest object is an object indicating a graphic page for the control target facility, the object associated with the interest object may be at least one of an object indicating a control point, an object indicating a real-time trend, an object indicating another graphic page, an object indicating equipment, an object indicating a control logic provided in the equipment, and an object indicating a controller.

When the interest object is an object indicating a control logic which is downloaded and executed in the controller installed in the control target facility, the object associated with the interest object may be at least one of an object indicating a control point providing an input value to the control logic, an object indicating another control logic providing an input value to the control logic, an object indicating another control logic receiving an output value of the control logic, an object indicating equipment controlled by an output value of the control logic, an object indicating a controller in which the control logic is downloaded, and an object indicating an operation schedule of the control logic.

Heretofore, the process of creating a control map, which is a part of the control map providing method, has been described with reference to FIGS. 3 and 4. In the above description, a situation that each of the peripheral nodes and each of the edges have the same importance has been assumed, but, actually, the first peripheral node and the second peripheral node may be different from each other in importance, and the first edge and the second edge may also be different from each other in importance. In order to reflect such a point, in the present embodiment, it is supported to set a weight value to each peripheral node and each edge. That is, as shown in FIG. 5, when the weight value of a specific peripheral node or a specific edge is inputted by a user terminal (S127-1), the inputted weighted value is set to the attribute value of the specific peripheral node or specific edge itself (S127-2). In this case, it should be noted that the weighted value of the peripheral node is the attribute value of the peripheral node, not the attribute value of the associated object matching the peripheral node. As the weight value increases, the importance of the peripheral node or the edge increases.

The weighted value of each peripheral node and the weight value of each edge can be used as basic data for calculating the risk of the central node. The method of calculating the risk of the central node will be described in detail later.

The control map, having been created by the above-mentioned method, is displayed on the user's display device according to the process shown in FIG. 6. First, when all the nodes and edges belonging to the control map are rendered (S128), the control map, which is a graphic data structure composed of a vertex and edges, is converted into a graphic structure, video data expressing the graphic structure is outputted (S136), and the control map is displayed through the user's display device receiving the video data (S138). This control map may be a personalized control map or a customized control map in that it is composed of only the objects desired by the user.

FIG. 7 shows an example of a screen for displaying a control map, which is displayed on the user's display device, as the result of performing the method of FIG. 6. A central node 50 is displayed at the center of the screen. A peripheral node 51 is connected with the central node 50 through one edge. Hereinafter, in the present specification, when the first node and the second node are connected by N edges, the relationship level between the first node and the second node is expressed by N. Therefore, the relationship level between the peripheral node 51 and the central node 50 is 1. Similarly, the relationship level between a peripheral node 52 and the central node 50 is 2. There is displayed a point having a weight value 53 of 2 on the edge between the central node 50 and the peripheral node 51. Here, the FIG. 54 displayed in each peripheral node expresses the abnormal state occurrence frequency of each peripheral node. Further, the FIG. 55 displayed next to each peripheral node expresses the weighed value of the peripheral node itself. The weighted value of the peripheral node is not displayed unless it is separately set.

In FIG. 7, only the attribute value of each peripheral node itself and only the attribute value of each edge itself are displayed. In another embodiment of the present invention, for the convenience of monitoring, the attribute value of the object matching each peripheral node may further be displayed. This case will be described with reference to FIG. 8.

The current value of the interest object matching the central node and the current value of the associated object matching each peripheral node may further be displayed (S130). The analog type control point object has a real number as the current value. The binary type control point object has ON/OFF (I/O or operation/stop) as the current value. The control logic object has operation/stop as the current value. The controller object has ON/OFF as the current value. However, the current value of the peripheral node matching the object having no attribute value, such as operation schedule, real-time trend, or the like, is not displayed.

It is shown in FIG. 9 that the current values 56a to 56l of the peripheral nodes are expressed in the form of text adjacent to each of the peripheral nodes.

It is shown in FIG. 10 that the weighted value of each edge is expressed in the thickness of the edge. It is shown in FIG. 11 that the abnormal stage occurrence frequency of each peripheral node is not expressed by the figure in the node, but expressed by the color or pattern filling the node. It is shown in FIG. 12 that the current values of the associated object matching each peripheral node are shown by abbreviations 57a and 57b. The event state values in the International Standard BACnet and the abbreviation conversion results according to an embodiment of the present are given in Table 1 below.

TABLE 1

| BACnet event state values fetched from device | Method of expressing state on node at the time of selecting "state information viewing" |
|---|---|
| NORMAL | none |
| FAULT | expressed by red "FLT" |
| OFFNORMAL | expressed by red "BA" |
| HIGH_LIMIT | expressed by red "HA" |
| LOW_LIMIT | expressed by red "LA" |
| HIG_LIMIT_WARN | expressed by red "HW" |
| LOW_LIMIT_WARN | expressed by red "LW" |
| FEEDBACK_ALARM | expressed by red "FBA" |
| SERVER_STOPPED | expressed by red "STOPPED" |
| WAIT | expressed by red "WAIT" |
| ERROR | Error code is expressed by character |

Meanwhile, as shown in FIG. 7, the abnormal state occurrence frequency values of each peripheral node may be displayed (S132), and the weighted values of each peripheral node and each edge may further be displayed (S134).

Further, as shown in FIG. 13, when there is a user selection input for each node of the control map created by the above control map providing method, a user interface for inquiring and changing the node attribute values may be displayed (S135). For example, when a user selects the peripheral node 56d, the user may immediately inquire the attribute value of the associated object matching the peripheral node 56d, may immediately correct the attribute value thereof, may manage the operation schedule of the associated object, or may inquire the real-time trend of the associated object (in the case where the associated object matching the peripheral node 56d has a current value).

Meanwhile, according to the present embodiment, the risk of the central node may also be calculated. Hereinafter, the relevant operations will be described with reference to FIGS. 14 to 19.

FIG. 14 is a flowchart of a process of calculating the risk of a central node, which is a part of the control map providing method. The risk of the central node may be calculated by collecting the abnormal state occurrence frequency values of the objects matching the peripheral nodes connected with the central node through one or more edges (S136). The abnormal state occurrence frequency value may be the number of times of abnormal states occurring during the specified period, but may also be the accumulated value of the number of times of abnormal states occurring after the corresponding object is managed by a remote control system.

Meanwhile, a weighted value may be reflected on each of the abnormal state occurrence frequency values (S138). More specifically, at least one of the first weighted value, the second weighted value, and the third weighted value may be reflected on each of the abnormal state occurrence frequency values (S138). Next, the risk of the central node is calculated using each of the abnormal state occurrence frequency values after reflecting the weighted value (S140).

How to determine the weight value with respect to the first peripheral node having the predetermined number of times of abnormal states is illustrated. The first weighted value may be a value set to be decreased with the increase in degree between the first peripheral node and the central node. For example, the first weighted value may be the inverse number of the relationship level between the first peripheral node and the central node. The second weighted value may be a value set using the attribute value of the peripheral node itself. For example, the second weight value may be the weighted value of the first peripheral node. The third weighted value may be a value set using the weighted value of the edge existing between the peripheral node and the central node. For example, the third weighted value may be the sum of weighted values of edges existing between the first peripheral node and the central node, or may be the weighted value of the first edge extending from the first peripheral node toward the central node.

The process of calculating the risk of the central node will be described with reference to FIG. 15. First, the first, second and third weighted values are applied to the abnormal state occurrence frequency value of each peripheral node. The first weighted value is the weighted value of the first edge extending from the peripheral node toward the central node, the second weighted value is the weighted value of the peripheral node, and the third weighted value is the inverse number of the relationship level between the peripheral node and the central node. The abnormal state occurrence frequency values of the peripheral nodes 60 to 73 of FIG. 15 after the application of the weighted values are given as follows.

Node (60): (0×2)/1=0
Node (61): (7×2)/2=7
Node (62): (3×3)/1=9
Node (63): (9×2)/2=9
Node (64): {(1×1)}×3/1=3
Node (65): (1×2)/2=1
Node (66): (2×2)/2=2
Node (67): (1×1)/1=1
Node (68): (0×1)/2=0
Node (69): (0×2)/1=0
Node (70): (1×4)/2=2
Node (71): (0×1)/1=0
Node (72): (1×1)/2=0.5
Node (73): (0×2)/2=0

According to an embodiment of the present invention, the risk of the central node may be calculated by dividing the sum of the abnormal state occurrence frequency values of the above fourteen peripheral nodes after the application of the weighted values thereof by the number of the above peripheral nodes. In this case, the risk thereof is (0+7+9+9+3+1+2+1+0+0+2+0+0.5+0)/14=about 2.46.

According to an embodiment of the present invention, the calculated risk may be adjusted based on the maximum risk that can occur. That is, when all of the peripheral nodes haves the maximum value of the abnormal state occurrence frequency values, the maximum risk is calculated, and the calculated risk is divided by the maximum risk, thereby adjusting the risk. That is, risk after adjustment=risk before adjustment/maximum risk. In order to calculate the risk after adjustment by percentage (%), the risk before adjustment is divided by the maximum risk and then multiplied by 100.

The maximum value of the abnormal state occurrence frequency values may be set to the attribute value of the interest node matching the central node, or may be set to the attribute value of the central node itself.

In order to calculate the maximum risk, the maximum value of the abnormal state occurrence frequency values is applied to all the peripheral nodes having suffered from abnormal state occurrence at least one time, and then the same weighted value as the risk before adjustment is applied thereto as follows. In this case, it is assumed that the maximum value of the abnormal state occurrence frequency values is 20.

Node (61): (20×2)/2=20
Node (62): (20×3)/1=60
Node (63): (20×2)/2=20
Node (64): {(20×1)}×3/1=60
Node (65): (20×2)/2=20
Node (66): (20×2)/2=20
Node (67): (20×1)/1=20
Node (70): (20×4)/2=40
Node (72): (20×1)/2=10

In this case, the maximum risk is (20+60+20+60+20+20+ 20+40+10)/14=about 19.28. Therefore, the risk after adjustment of percentage is calculated by 2.46/19.28×100=about 12.75.

Referring to FIG. 14 again, rendering may be performed such that the calculated risk of the central node is further displayed (S142). FIG. 16 shows an example of a screen that is displayed on the user's display device, as the result of performing the method of FIG. 14. As shown in FIG. 16, the numerical value 74 of the risk of the central node may be displayed at a position adjacent the central node. However, when a very large number of figures are displayed on the control map, awareness may be deteriorated. Therefore, the risk of the central node may be displayed in the form of color or pattern in the central node. The color or pattern may be determined according to the section including the risk. For example, the color of the risk is green in the case of a risk section of 0 to 5, yellow in the case of a risk section of 6 to 10, orange in the case of a risk section of 11 to 20, red in the case of a risk section of 21 to 100, and black in the case of a risk section of more than 100. In this example, the color in the central node may be orange.

Referring to FIG. 14 again, a risk alarm signal according to notification means corresponding to the risk section of the central node may be transmitted to the pre-specified contact of a manager (S144). FIG. 17 is a view for explaining risk alarm signal transmission. As shown in FIG. 17, when the risk is finally set to 55, it corresponds to notification section 3. Therefore, the risk alarm signal will be transmitted in the manner of smart phone message notification and SMS notification corresponding to the notification section 3.

According to the process of calculating a risk, having been described heretofore, it is impossible to reflect the risk according to the comparison result of the attribute values of the associated objects different from each other. For example, the point that an air conditioner is problematic when the air supply temperature of the air conditioner is equal to or lower than the air ventilation temperature thereof cannot be reflected on the above mentioned process of calculating a risk. According to an embodiment of the present invention, the calculated risk may further be adjusted by reflecting the operation of comparing the attribute values of the peripheral nodes through a control logic and the operation result of the control logic. This embodiment will be described with reference to FIGS. 18 and 19.

FIG. 18 is a detailed flowchart for specifically explaining the risk calculating operation of FIG. 4.

First, a basic risk is calculated by the method described with reference to FIG. 15 (S1400). For the convenience of understanding, the risk calculated by the method described with reference to FIG. 15 is referred to as "basic risk".

Next, a control logic for comparing the attribute values of the associated objects is created (S1402). More specifically, a control logic for comparing the attribute value of the object matching the first peripheral node with the attribute value of the object matching the second peripheral node among the plurality of peripheral nodes directly and indirectly connected to the central node is created.

FIG. 19 shows an example of the created control logic (created in a graphic form). It is assumed that an air conditioner is created as a central node, and the air supply temperature control point and air ventilation temperature control point are respectively created as peripheral nodes. The block represented by "AHU02-SAT" indicates an air supply temperature control point, the block represented by "AH02-SAU" indicates an air ventilation temperature control point, and the block represented by "COMP" indicates a comparison operation. The result of the comparison operation is outputted through the block represented by "OUTPUT". The control logic shown in FIG. 19 outputs a TRUE value when the air supply temperature of the air conditioner is equal to or lower than the air ventilation temperature thereof, and output a FALSE value when the air ventilation temperature of the air conditioner is equal to or lower than the air supply temperature thereof.

The control logic is compiled in the form of a code that can be executed by a controller, and is then downloaded in a controller (for example, DDC) for controlling the air conditioner (S1404).

Next, an additional risk is determined using the output value of the control logic. The final risk is the sum of the basic risk and the additional risk. For example, if the output value of the control logic is TRUE, the basic risk will be increased by the additional risk.

Meanwhile, according to another embodiment, the control logic can directly output the final risk using the input basic risk. In this case, a control logic for receiving the risk of the central node, comparing the attribute value of the objet matching the first peripheral node with the attribute value of the object matching the second peripheral node among the plurality of peripheral nodes directly and indirectly connected to the central node, adjusting the risk of the central node according to the comparison result, and outputting the adjusted risk is created (S1402). In this case, the output value of the control logic is provided from the controller, and the risk provided from the control logic is expressed as the risk of the central node.

The control map providing method according to embodiments of the present invention, having been described with reference to FIGS. 3 to 19, can be implemented in a computer-readable medium as a computer-readable code. The computer-readable medium may be a mobile recording medium (CD, DVD, Blu-ray Disc, USB, or mobile hard disc) or a fixed recording medium (ROM, RAM, or hard disk installed in computer). The computer program recorded in the computer-readable recording medium is transmitted to another computing apparatus through a network, such as internet, to be installed in another computing apparatus, and thus this computer program can be used in another computing apparatus.

According to another embodiment of the present invention, there is provided a computer program recorded in a recording medium, in which the computer program executes the following steps in conjunction with a computing apparatus: creating a central node which one-to one matches an interest object selected from objects managed by a remote control system, the interest object being selected by a user; creating peripheral nodes, each of which one-to-one match an object associated with the interest object, the object being selected from the objects managed by the remote control system; creating an edge which connects the central node and the peripheral node or connects the peripheral nodes; and graphically rendering the central node, the peripheral node, and the edge.

Hereinafter, the configuration and operation of a control map providing apparatus according to still another embodiment of the present invention will be described. FIG. 20 is a block diagram of the control map providing apparatus according to this embodiment. As shown in FIG. 20, the control map providing apparatus 10 according to this embodiment may include a personalized control map creating unit 12, a rendering unit 13, and a video output unit 14. This control map providing apparatus 10 may further include a user interface receiving an input of creation of nodes and edges, an input of weighted values of the created nodes and edges, and an input of direct access to the object matching the node.

The personalized control map creating unit 12 creates a central node which one-to one matches an interest object selected from objects managed by a remote control system, the interest object being selected by a user, creates peripheral nodes, each of which one-to-one match an object associated with the interest object, the object being selected from the objects managed by the remote control system, and creates edges which connect the central node and the peripheral node or connects the peripheral nodes.

The rendering unit 13 graphically renders the central node, the peripheral nodes, and the edges.

The video output unit 14 transmits data for displaying the rendering result to a user terminal through a network (not shown).

Each of the components of FIG. 20 may be software or hardware, such as a field-programmable gate array (FPGA) or an application-specific integrated circuit (ASIC). However, these components are not limited to software or hardware, and may be configured to exist in a storage medium that can perform addressing, and may also be configured to execute one or more processors. The functions of the components may be implemented by more finely-divided components, and the plurality of components may also be converted into one component having a specific function.

FIG. 21 is a block diagram of hardware of the control map providing apparatus according to another embodiment of the present invention. The control map providing apparatus 10 may have a configuration shown in FIG. 21. The control map providing apparatus 10 may include a processor 18 for executing commands, a storage device 16 for storing computer program data providing a control map providing function, memory 19, a network interface 17 for data communication with an external device, and a system bus 15 connected to the processor, 18, the storage device 16, the network interface 17, and the memory to serve as a data passage.

The computer program providing a control map providing function may include: a series of instructions for creating a central node which one-to one matches an interest object selected from management target objects of a control target facility by a user, creating peripheral nodes, each of which one-to-one match an object associated with the interest object, the object being selected from the objects managed by a remote control system, and creating an edge which connects the central node and the peripheral node or connects the peripheral nodes; a series of instructions for graphically rendering the central node, the peripheral node, and the edge; and a series of instructions for outputting data for displaying the rendering result.

In an embodiment, the network interface 17 may be connected to the controller installed in the control target facility. In this case, the computer program providing a control map providing function may further include: a series of instructions for receiving attributes value of the object from the controller through the network interface; and a serious instructions for performing rendering for displaying at least some of the attribute values of the matched object, with respect to at least one node of the central node and the peripheral nodes.

In an embodiment, at least some types of objects of the associated object may have abnormal state occurrence frequency values. In this case, the computer program providing a control map providing function may further include: a series of instructions for collecting the abnormal state occurrence frequency values of an object matching the peripheral node and calculating a risk of the central node; a series of instructions for downloading a control logic in a controller, the control logic comparing an attribute value of an object matching a first peripheral node with an attribute value of an object matching a second peripheral node among the plurality of peripheral nodes directly and indirectly connected to the central node; a series of instructions for adjusting the risk of the central node based on the output value of the control logic; and a serious instructions for performing rendering for displaying information about the risk of the central node. In this case, the network interface 17 may be connected to the controller through a network (not shown) in order to transmit the control logic.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of providing a control map for a control target facility, the method comprising:
   generating a central node corresponding to an interest object, the interest object being selected by a user from among first objects managed by a remote control system;
   generating peripheral nodes respectively corresponding to second objects that are associated with the interest object, the second objects being selected from among the first objects;
   generating an edge which connects the central node to one of the peripheral nodes or connects the peripheral nodes to each other; and
   graphically rendering the central node, the peripheral nodes, and the edge to be displayed,
   wherein at least two of the second objects corresponding nodes have abnormal state occurrence frequency values, wherein the method further comprises:
collecting the abnormal state occurrence frequency values of the at least two of second objects corresponding to the peripheral nodes and calculating a risk of the central node based on the collected abnormal state occurrence frequency values, and
wherein the rendering comprises:
displaying information about the risk of the central node.

2. The method of claim 1, wherein the interest object or one of the second objects comprises at least one from among an object indicating a control report on the control target facility, an object indicating a graphic page for the control target facility, and an object indicating a real-time trend of a control point in the control target facility.

3. The method of claim 1, wherein the interest object comprises an object indicating an equipment installed in the control target facility,
wherein the generating the peripheral node comprises:
determining an object connected to the equipment; and
automatically generating a peripheral node corresponding to the determined object,
wherein the generating the edge comprises:
automatically generating an edge connecting the central node and the automatically generated peripheral node, and
wherein the determined object comprises at least one from among an object indicating a control point of the equipment, an object indicating a control logic installed in the equipment, and an object indicating an operation schedule of the equipment.

4. The method of claim 1, wherein the interest object comprises an object indicating a controller installed in the control target facility,
wherein the generating the peripheral node comprises:
determining an object that belongs to the controller; and
automatically generating a peripheral node corresponding to the determined object,
wherein the generating the edge comprises:
automatically generating an edge connecting the central node and the automatically generated peripheral node, and
wherein the determined object comprises at least one from among an object indicating a control point configured to provide an input to the controller, an object indicating a control logic installed in the controller, and an object indicating an operation schedule of the controller.

5. The method of claim 1, wherein the interest object comprises an object indicating a graphic page for the control target facility,
wherein the generating the peripheral node comprises:
determining an object displayed on the graphic page; and
automatically generating a peripheral node corresponding to the determined object,
wherein the generating the edge comprises:
automatically generating an edge connecting the central node and the automatically generated peripheral node, and
wherein the determined object comprises at least one from among an object indicating a control point in the control target facility, an object indicating a real-time trend of the control point, an object indicating another graphic page for the control target facility, an object indicating an equipment installed in the control target facility, and an object indicating a controller installed in the control target facility.

6. The method of claim 1, wherein the interest object comprises an object indicating a control logic which is downloaded and executed in a controller, the controller being installed in the control target facility,
wherein the generating the peripheral node comprises:
determining an object associated with the control logic; and
automatically generating a peripheral node corresponding to the determined object,
wherein the generating the edge comprises:
automatically generating an edge connecting the central node and the automatically generated peripheral node, and
wherein the determined object comprises at least one from among an object indicating a control point configured to provide an input value to the control logic, an object indicating another control logic configured to provide the input value to the control logic, an object indicating an equipment controlled by an output value of the control logic, an object indicating the controller in which the control logic is downloaded, and an object indicating an operation schedule of the control logic.

7. The method of claim 1, wherein the rendering comprises:
displaying information about a current value of at least one of the interest object and the second objects corresponding to at least one node among the central node and the peripheral nodes, and
wherein the information about the current value is updated in response to a change to the current value.

8. The method of claim 7, wherein the rendering comprises:
further displaying, in a form of abbreviation, event information provided in the at least one of the interest object and the second objects according to a building automation and control networks (BACnet) standard, with respect to the at least one node among the central node and the peripheral nodes,
wherein the abbreviation is updated in response to a change to the event information.

9. The method of claim 1, wherein a second object corresponding to a certain peripheral node has an abnormal state occurrence frequency value, and
wherein the rendering comprises:
displaying information about the abnormal state occurrence frequency value of the second object corresponding to the certain peripheral node.

10. The method of claim 1, wherein the peripheral node has an attribute value of a weighted value, and the edge has an attribute value of a weighted value, and
wherein the rendering comprises:
displaying information about the weighted value of the peripheral node and information about the weighted value of the edge.

11. The method of claim 1, further comprising:
providing a user interface configured to receive an input for selecting a node among the central node and the peripheral nodes to determine or change an attribute value of one of the interest object and the second objects corresponding to the selected node.

12. The method of claim 1, wherein the calculating comprises:
applying a first weighted value and a second weighed value to each of the abnormal state occurrence frequency values corresponding to the peripheral nodes,
wherein the first weighted value is a value set to be decreased in response to an increase in a relationship degree between a corresponding peripheral node and the central node, and the second weighted value is a value set using an attribute value of the corresponding peripheral node.

13. The method of claim 12, wherein the calculating comprises:
further applying a third weighted value to the each of the abnormal state occurrence frequency values corresponding to the peripheral nodes,
wherein the third weighted value is a value set using a weighted value of an edge existing between the corresponding peripheral node and the central node.

14. The method of claim 1, further comprising:
determining a notification type corresponding to a range of the risk of the central node; and
transmitting a risk alarm signal according to the determined notification type.

15. The method of claim 1, further comprising:
downloading a control logic in a controller that is installed in the control target facility;
comparing, by using the control logic, an attribute value of a second object corresponding to a first peripheral node with an attribute value of a second object corresponding to a second peripheral node among the peripheral nodes, the peripheral nodes being directly and indirectly connected to the central node;
receiving an output value of the control logic from the controller based on a result of the comparing; and
adjusting the risk of the central node based on the output value of the control logic.

16. The method of claim 1, further comprising:
downloading a control logic in a controller that is installed in the control target facility; and
by using the control logic, receiving the risk of the central node, comparing an attribute value of a second object corresponding to a first peripheral node with an attribute value of a second object corresponding to a second peripheral node among the peripheral nodes, the peripheral nodes being directly and indirectly connected to the central node, adjusting the risk of the central node based on a result of the comparing, and outputting the adjusted risk of the central node,
wherein the rendering comprises:
displaying the adjusted risk of the central node that is output from the controller.

17. A non-transitory computer-readable recording medium storing a computer program which, when executed by a computer, causes the computer to execute:
generating a central node corresponding to an interest object, the interest object being selected by a user from among first objects that are managed by a remote control system;
generating peripheral nodes respectively corresponding to second objects that are associated with the interest object, the second objects being selected from among the first objects;
generating an edge which connects the central node to one of the peripheral nodes or connects the peripheral nodes to each other; and
graphically rendering the central node, the peripheral nodes, and the edge
wherein at least two of the second objects corresponding nodes have abnormal state occurrence frequency values,
wherein the method further comprises:
collecting the abnormal state occurrence frequency values of the at least two of second objects corresponding to the peripheral nodes and calculating a risk of the central node based on the collected abnormal state occurrence frequency values, and
wherein the rendering comprises:
displaying information about the risk of the central node.

18. An apparatus for providing a control map for a control target facility, the apparatus comprising:
at least one processor;
a memory; and
a non-transitory storage device in which an executable file of a computer program is recorded, the executable file being loaded in the memory and executed by the at least one processor,
wherein the computer program comprises:
a series of instructions configured to cause the at least one processor to generate a central node corresponding to an interest object that is selected by a user from among management target objects managed by a remote control system of the control target facility, generate peripheral nodes respectively corresponding to first objects that are associated with the interest object, the first objects being selected from the management target objects, and generate an edge which connects the central node to one of the peripheral nodes or connects the peripheral nodes to each other, wherein at least two of the first objects corresponding nodes have abnormal state occurrence frequency values;
a series of instructions configured to cause the at least one processor to perform graphical rendering of the central node, the peripheral nodes, and the edge;
a series of instructions configured to collect the abnormal state occurrence frequency values of the at least two of first objects corresponding to the peripheral nodes and calculate a risk of the central node based on the collected abnormal state occurrence frequency values; and
a series of instructions configured to cause the at least one processor to output data for displaying a result of the graphical rendering and the risk of the central node.

19. The apparatus of claim 18, further comprising a network interface, which is connected to a controller installed in the control target facility, and
wherein the computer program further comprises:
a series of instructions configured to cause the at least one processor to receive attribute values of the interest object and the first objects from the controller through the network interface; and
a series of instructions configured to cause the at least one processor to perform the graphical rendering to display at least one of the attribute values of the interest object and the first objects, with respect to at least one node among the central node and the peripheral nodes.

20. The apparatus of claim 18, wherein at least two of the first objects have abnormal state occurrence frequency values, and wherein the computer program further comprises:
  a series of instructions configured to cause the at least one processor to collect the abnormal state occurrence frequency values of the at least two of the first objects corresponding to the peripheral nodes and calculate the risk of the central node based on the collected abnormal state occurrence frequency values;
  a series of instructions configured to cause the at least one processor to download a control logic in a controller, the control logic configured to compare an attribute value of a first object corresponding to a first peripheral node with an attribute value of a first object corresponding to a second peripheral node among the peripheral nodes, the peripheral nodes being directly and indirectly connected to the central node;
  a series of instructions configured to cause the at least one processor to adjust the risk of the central node based on a result of comparison that is output from the control logic; and
  a series of instructions configured to cause the at least one processor to perform the graphic rendering to display information about the adjusted risk of the central node.

21. An apparatus for providing a control map for a control target facility, the apparatus comprising:

a personalized control map generator generates a central node corresponding to an interest object, the interest object being selected by a user from among first objects managed by a remote control system, generate peripheral nodes respectively corresponding to second objects associated with the interest object, the second objects being selected from the first objects, and generate an edge which connects the central node to one of the peripheral nodes or connects the peripheral nodes to each other;
  a renderer performs graphical rendering of the central node, the peripheral nodes, and the edge; and
  a video outputter outputs data for displaying a result of the graphical rendering,
  wherein at least two of the second objects corresponding nodes have abnormal state occurrence frequency values,
  wherein the personalized control map generator collects the abnormal state occurrence frequency values of the at least two of second objects corresponding to the peripheral nodes and calculating a risk of the central node based on the collected abnormal state occurrence frequency values, and
  wherein the video outputter further outputs data for further displaying the information about the risk of the central node.

* * * * *